United States Patent
Tamura

(10) Patent No.: US 8,437,320 B2
(45) Date of Patent: May 7, 2013

(54) WIRELESS LAN ACCESS POINT

(75) Inventor: Yoshiteru Tamura, Aichi (JP)

(73) Assignee: Buffalo Inc., Nagoya-shi (JP)

( * ) Notice: Subject to any disclaimer, the term of this patent is extended or adjusted under 35 U.S.C. 154(b) by 1074 days.

(21) Appl. No.: 12/198,330

(22) Filed: Aug. 26, 2008

(65) Prior Publication Data

US 2009/0059878 A1 Mar. 5, 2009

(30) Foreign Application Priority Data

Aug. 28, 2007 (JP) ................................. 2007-220472

(51) Int. Cl.
 *H04Q 7/24* (2006.01)
(52) U.S. Cl.
 USPC .......................................................... 370/338
(58) Field of Classification Search .................... 370/338
 See application file for complete search history.

(56) References Cited

U.S. PATENT DOCUMENTS

| | | | | |
|---|---|---|---|---|
| 2004/0121749 | A1* | 6/2004 | Cui et al. .................... | 455/226.1 |
| 2005/0132193 | A1 | 6/2005 | Ishidoshiro et al. | |
| 2005/0238172 | A1 | 10/2005 | Tamura | |
| 2006/0165103 | A1* | 7/2006 | Trudeau et al. ............... | 370/401 |

FOREIGN PATENT DOCUMENTS

| | | |
|---|---|---|
| JP | 2003-143161 | 5/2003 |
| JP | 2005-175524 | 6/2005 |
| JP | 2005-311653 | 11/2005 |
| JP | 2006-186941 | 7/2006 |
| JP | 2006-211362 | 8/2006 |
| JP | 2007-266942 | 10/2007 |
| WO | WO 2005/069784 A2 | 8/2005 |
| WO | WO 2006/035409 A1 | 4/2006 |

OTHER PUBLICATIONS

"Virtual Access Point Technique for Diversifying Wireless LAN Services", White Paper, Colubris Networks, URL: http://japan.colubris.com/download/WP_VAP.pdf, Jul. 10, 2005, 9 pages.
Sound, Image, Data Processing Functions Integrated with One High Expandability Wireless LAN, White Paper, Colubris Networks, URL: http://japan.colubris.com/download/WP_VAP_QOS.pdf, Jul. 10, 2005, 9 pages.

* cited by examiner

*Primary Examiner* — Sulaiman Nooristany
(74) *Attorney, Agent, or Firm* — Oblon, Spivak, McClelland, Maier & Neustadt, L.L.P.

(57) ABSTRACT

A wireless LAN (Local Area Network) access point includes: a housing; and a plurality of sub-access points provided in the housing. The plurality of sub-access points being operable independently of one another.

9 Claims, 12 Drawing Sheets

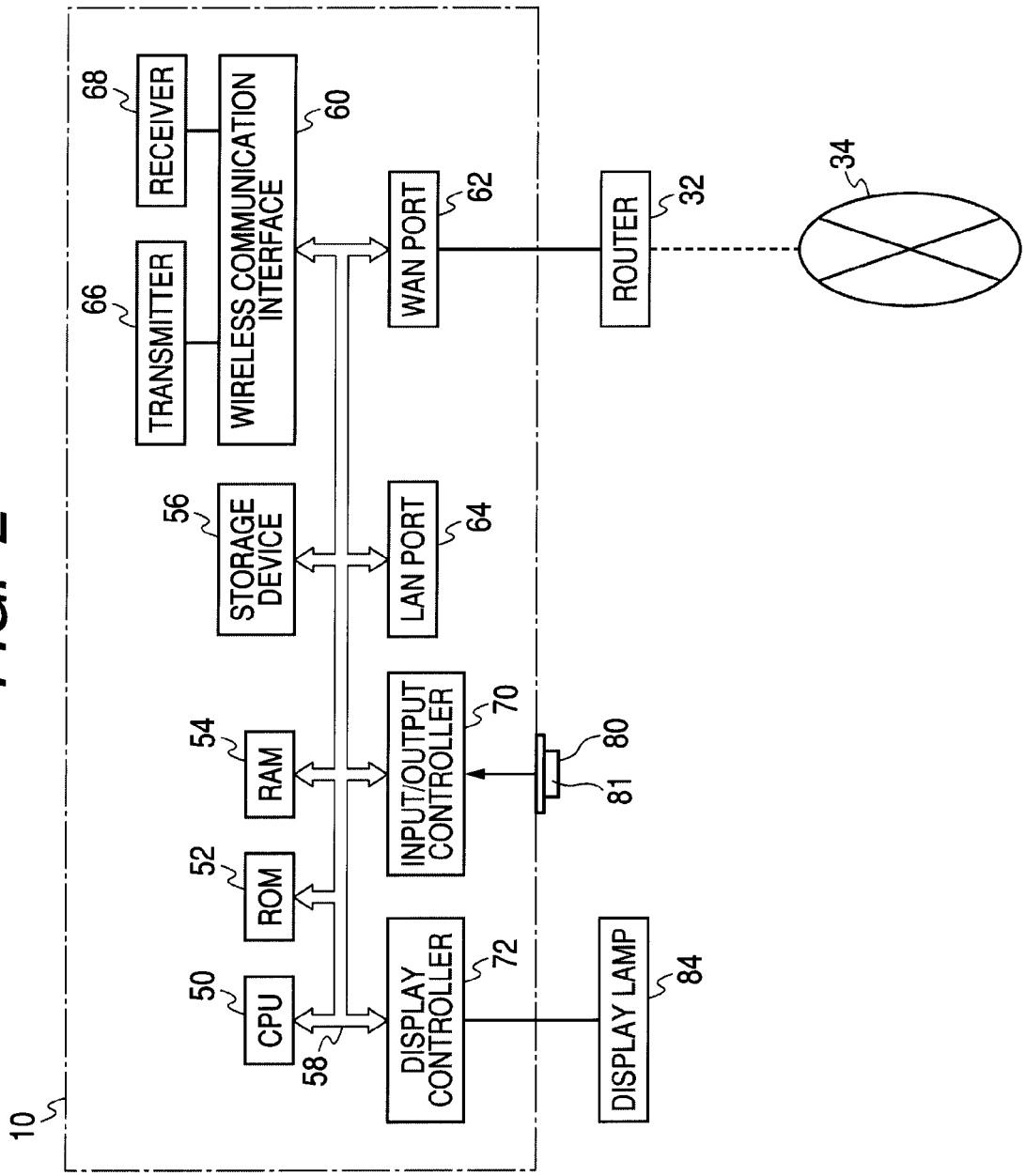

FIG. 5A

|  | SUB-AP1 | TERMINAL NO.1 |  |
|---|---|---|---|
| SECURITY LEVEL AVAILABLE | AES | AES<br>TKIP<br>WEP128<br>WEP64 |  |
|  | SUB-AP2 | TERMINAL NO.2 |  |
| SECURITY LEVEL AVAILABLE | TKIP | TKIP<br>WEP128<br>WEP64 |  |
|  | SUB-AP3 | TERMINAL NO.3 | TERMINAL NO.4 |
| SECURITY LEVEL AVAILABLE | WEP128<br>WEP64 | WEP128<br>WEP64 | WEP64 |

FIG. 5B

|  | SUB-AP1 | TERMINAL NO.1 |  |
|---|---|---|---|
| SECURITY LEVEL AVAILABLE | [AES] | [AES] TKIP WEP128 WEP64 |  |
|  | SUB-AP2 | TERMINAL NO.2 |  |
| SECURITY LEVEL AVAILABLE | [TKIP] | [TKIP] WEP128 WEP64 |  |
|  | SUB-AP3 | TERMINAL NO.3 | TERMINAL NO.4 |
| SECURITY LEVEL AVAILABLE | TKIP [WEP128] WEP64 | TKIP [WEP128] WEP64 | [WEP128] WEP64 |

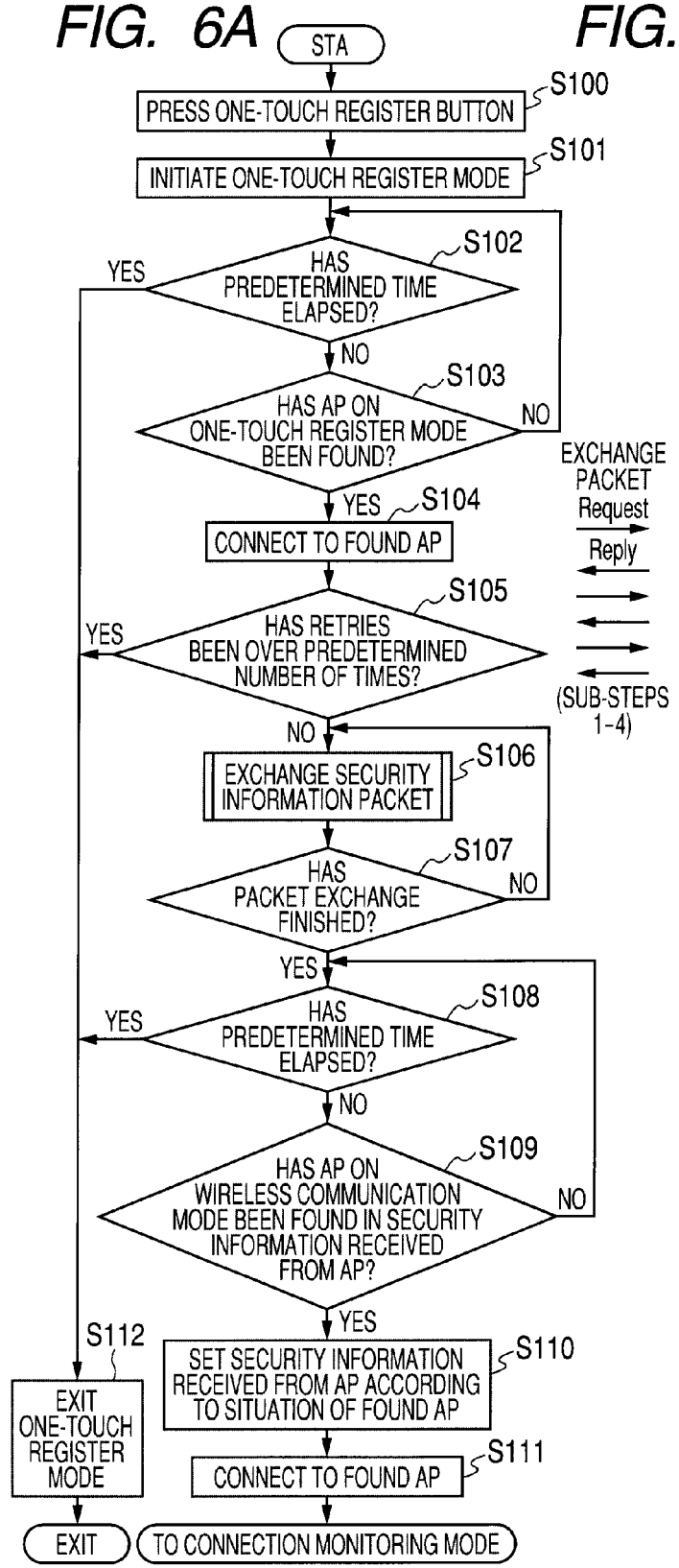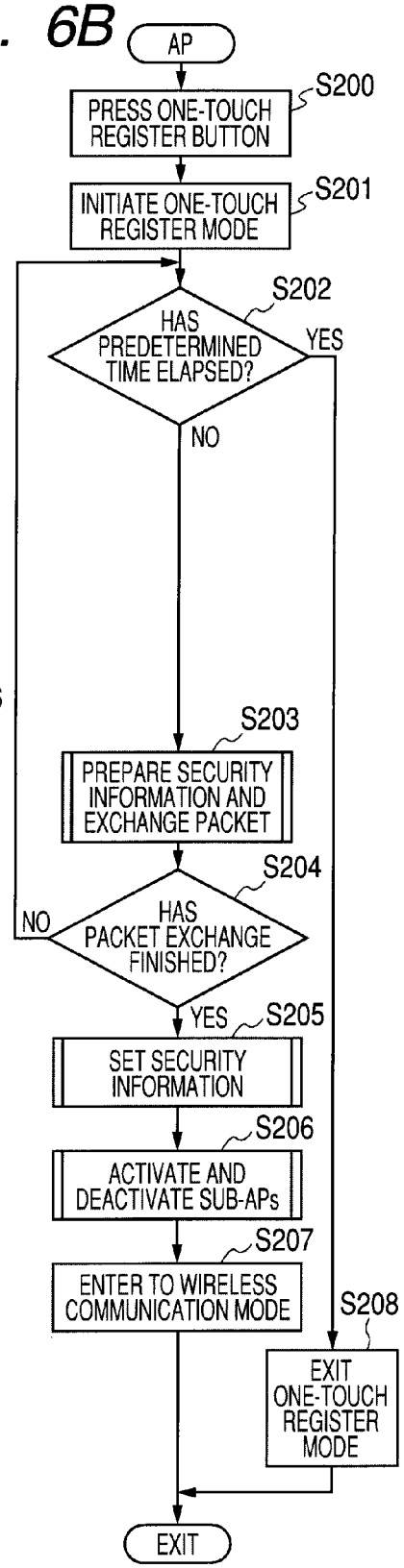

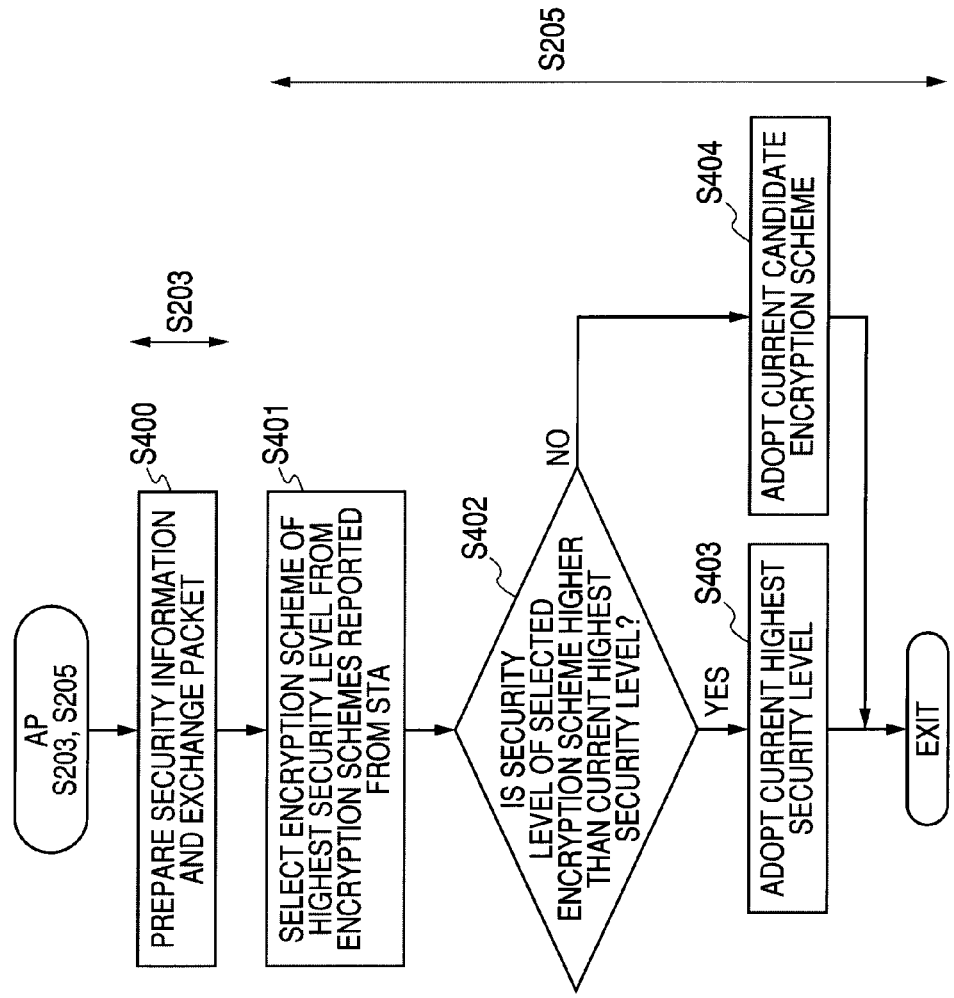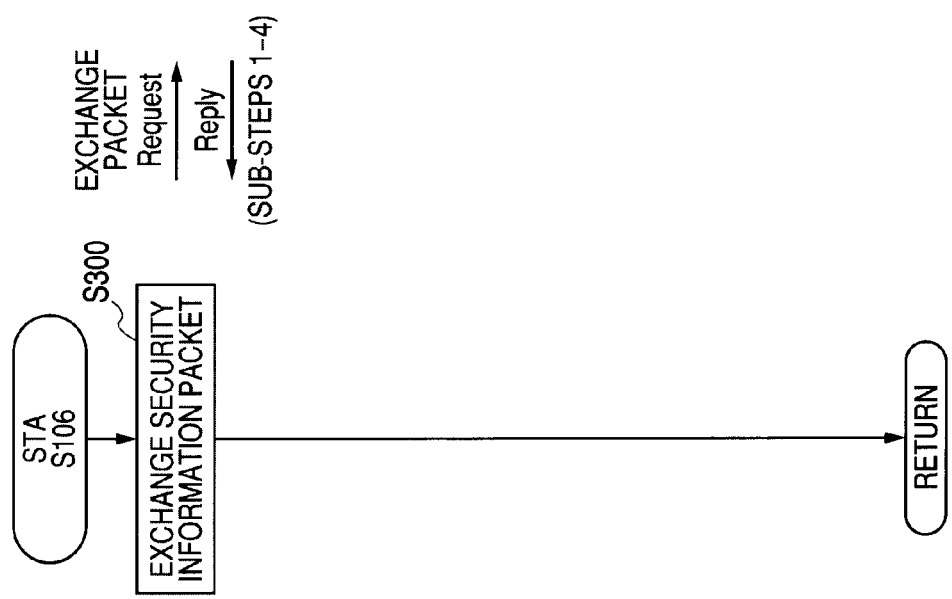

US 8,437,320 B2

WIRELESS LAN ACCESS POINT

CROSS-REFERENCE TO RELATED APPLICATIONS

This application is based upon and claims the benefit of priority from Japanese Patent Application No. 2007-220472, filed on Aug. 28, 2007, the entire contents of which are incorporated herein by reference.

TECHNICAL FIELD

The present invention relates to an access point for use in a wireless LAN (Local Area Network) (hereinafter referred as a "wireless LAN access point").

BACKGROUND

A wireless LAN (Local Area Network) is widely used for providing wireless communication among a plurality of terminals (e.g., a PC (personal computer), a portable terminal such as a Personal Digital Assistant (PDA) and an information processing apparatus including a computer) which are spaced from one another.

In the wireless LAN, the plurality of terminals (slave units) are wirelessly connected to a common access point (a master unit). The access point relays signals among the plurality of terminals.

In the wireless LAN, a need is arisen for secured communication among terminals in the same wireless LAN. To address the need, US 2005/0132193 A1 and US 2005/0238172 A1 describes encrypted communication between the access point and the terminal in the wireless LAN.

In order to establish encrypted communication between the access point and the respective terminals in the wireless LAN, a setup of the security is required between the access point and the respective terminals to select a common security level of the encryption scheme that is supported by both the access point and the respective terminals.

The plurality of terminals connected to the same access point do not always have the same encryption profile. The "encryption profile" includes a condition on encryption capability, which corresponds to the highest security level of security levels that the respective terminals support. For example, a terminal (e.g., a gaming machine) having low encryption capability and a terminal (e.g., a PC) having high encryption capability may share the same access point.

When the plurality of terminals with different encryption capability are connected the same access point, the security level finally adopted by the terminals is indiscriminately degraded to a security level corresponding to the minimum encryption capability among the terminals.

SUMMARY

One aspect of the invention has been conceived in view of the above circumstances and has an object to provide improved technique of selecting encryption scheme of a security level used in a wireless connection between the access point and the respective terminals.

According to an aspect of the invention, there is provided a wireless LAN (Local Area Network) access point comprising: a plurality of sub-access points to which different unique identifiers are respectively assigned and which are operable independently of one another, wherein the plurality of sub-access points include a plurality of normal sub-access points that support a plurality of encryption schemes respectively associated with different security levels, and wherein one or more encryption schemes of the plurality of encryption schemes are assigned to each of the plurality of normal sub-access points to allow each of the plurality of normal sub-access points to perform wireless communication using one of the assigned encryption schemes, such that highest security levels of the respective normal sub-access points are different from one another.

According to another aspect of the invention, there is provide a wireless LAN (Local Area Network) access point comprising: a housing; and a plurality of sub-access points provided in the housing, the plurality of sub-access points being operable independently of one another.

According to still another aspect of the invention, there is provided a computer-readable medium having a computer program stored thereon and readable by a computer, said computer program, when executed by the computer, causes the computer to perform operations for a wireless LAN (Local Area network) access point that comprises a plurality of sub-access points provided in a housing and being operable independently of one another, said operations comprising: selecting an encryption scheme for one sub-access point regardless of an encryption scheme selected for another normal sub-access point.

BRIEF DESCRIPTION OF THE DRAWINGS

FIG. 2 is a schematic block diagram showing the hardware configuration of the wireless LAN access point shown in FIG. 1;

FIGS. 5A and 5B show examples of tables for describing that the plurality of sub-APs shown in FIG. 4 having a different selectable security levels and security levels selected by the respective sub-APs in accordance with security levels supported by the terminals wirelessly connected to the respective sub-APs;

FIGS. 6A and 6B are flowcharts schematically showing a connection establishment program executed by each of the terminals and LAN access point, respectively;

FIG. 8A is a flowchart schematically showing details of step S106 shown in FIG. 6;

FIG. 8B is a flowchart schematically showing details of step S203 shown in FIG. 6;

DESCRIPTION

Illustrative, non-limiting embodiments of the present invention will be described in detail with reference to the drawings.

Figure 1:
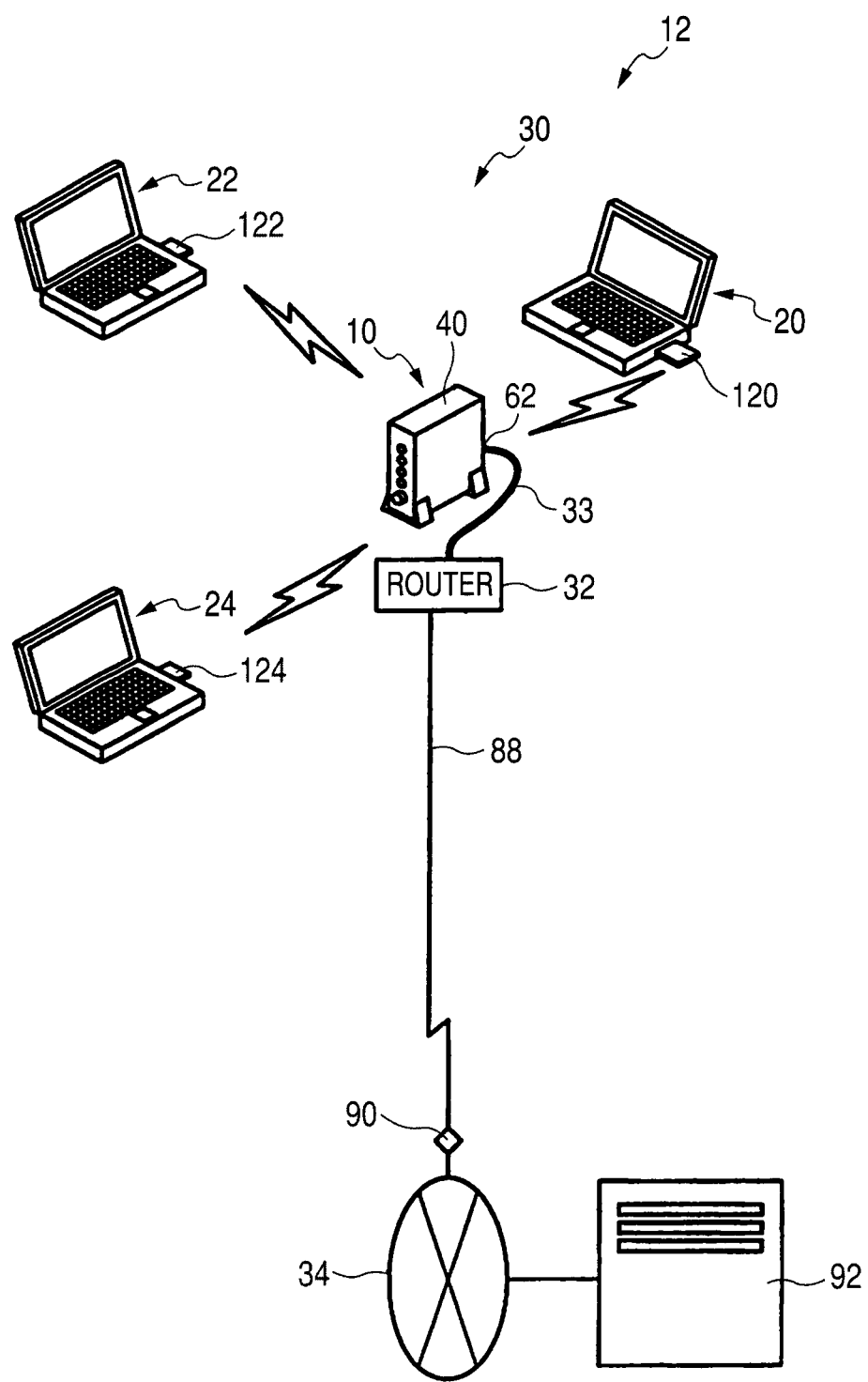
FIG. 1 is a perspective view showing a wireless LAN system including an access point for a wireless LAN according to an embodiment of the present invention, along with the Internet as an example of a global network.

FIG. 1 is a perspective view of a wireless LAN system 12 including an access point (hereinafter abbreviated as "AP") 10 used in a wireless LAN according to an embodiment of the invention.

<Configuration of Wireless LAN>

In the wireless LAN system 12, a wireless LAN 30 wirelessly interconnects a plurality of terminals (wireless terminals) 20, 22 and 24 via the AP 10. That is, the wireless LAN 30 includes a plurality of terminals 20, 22 and 24 and the AP 10 configured to relay the signal between the terminals 20, 22 and 24. The wireless LAN 30 is connected to global network such as a WAN (Wide Area Network) or the Internet 34 via a router 32.

<Functions of AP>

The AP 10 serves as a wireless base station and is also referred to as a master unit. The AP 10 controls an access right that allows the respective terminals 20, 22 and 24 to establish a wireless communication with other terminals in the wireless LAN 30. The AP 10 also controls a security level (encryption strength) for an encrypted wireless communication using an encryption key (e.g., a WEP key, a TKIP key, or an AES key).

<Functions of Terminal>

Each of the terminals 20, 22 and 24 can wirelessly communicate with other terminals belonging to the same wireless LAN 30. The terminal is referred to as a station (abbreviated as "STA" in the drawings) or a slave unit in connection with the relationship with the AP 10 belonging to the same wireless LAN 30. Each of the terminals 20, 22 and 24 may be various types of terminals such as a personal computer PC, a personal digital assistant PDA, or an information processing apparatus with a built-in computer.

<Hardware Configuration of AP>

As shown in FIG. 1, the AP 10 includes a housing 40. Various hardware components are provided within the housing 40. FIG. 2 is a schematic block diagram of a hardware configuration of the AP 10. As shown in FIG. 2, the AP 10 includes a computer. The computer includes: a CPU 50; ROM 52; RAM 54; a nonvolatile storage device 56 capable of retaining data even when not powered such as a hard disk drive; and a bus 58 electrically interconnects these components.

As shown in FIG. 2, the AP 10 further includes: a wireless communication interface 60 configured to allow wireless communication with the respective terminals 20, 22 and 24; a WAN port 62 configured to allow a connection to a WAN (e.g., the Internet 34); and a LAN port 64 configured to allow a connection to a wired LAN (not shown), all of which are connected to the bus 58.

The wireless communication interface 60 is connected to a transmitter 66 configured to transmit radio waves and a receiver 68 configured to receive radio waves. The transmitter 66 and the receiver 68 are built in the AP 10 to allow transmission/reception of radio waves to/from the outside of the AP 10.

The AP 10 further includes: an input/output controller (I/O controller) 70 configured to allows input/output of information from the user; and a display controller 72 configured to display information for the user, both of which are connected to the bus 58.

Figure 3A:
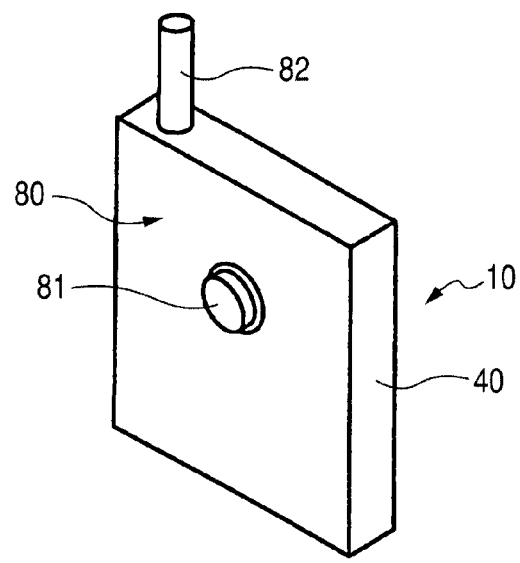
FIG. 3A is a perspective view showing the wireless LAN access point shown in FIG. 1.

A push-type one-touch register button 80 is connected to the input/output controller 70. As shown in FIG. 3A, the one-touch register button 80 includes an operation portion 81 and is attached to the housing 40 such that the operation portion 81 exposes from the surface of the housing 40 of the AP 10. The CPU 50 is configured to detect pressed state of the one-touch register button 80 via the input/output controller 70. Accordingly, when the use presses the one-touch register button 80, the CPU 50 can detect an input from the one-touch register button 80. As shown in FIG. 3A, shows an antenna 82 connected to the transmitter 66 and the receiver 68 to transmit and receive the radio waves.

As shown in FIG. 2, the display controller 72 is connected to various display lamps 84 configured to indicate various states such as a connection state to the wireless LAN 30 and a communication state in the wireless LAN 30. The display lamps 84 perform several indication methods such as lighting and blinking to indicate the states.

As shown in FIG. 1, the router 32 includes a built-in modem and is connected to the WAN port 62 of the AP 10 by a cable 33. The router 32 identifies the respective terminals 20, 22 and 24 by MAC (Media Access Control) addresses. The MAC address is a physical address unique identification information inherently assigned to each of wireless LAN adaptors 120, 122 and 124 (see FIG. 1) attached to the corresponding one of terminals 20, 22 and 24.

The respective terminals 20, 22 and 24 are accessible to the Internet 34 via a contracted provider 90 to obtain information such as desired WEB contents from the server 92 connected to the Internet 34.

<Virtual Multiplexing of MAC>

The AP 10 can support a plurality of encryption schemes of different security levels for encrypting signals transferred on the wireless LAN 30.

Figure 4:
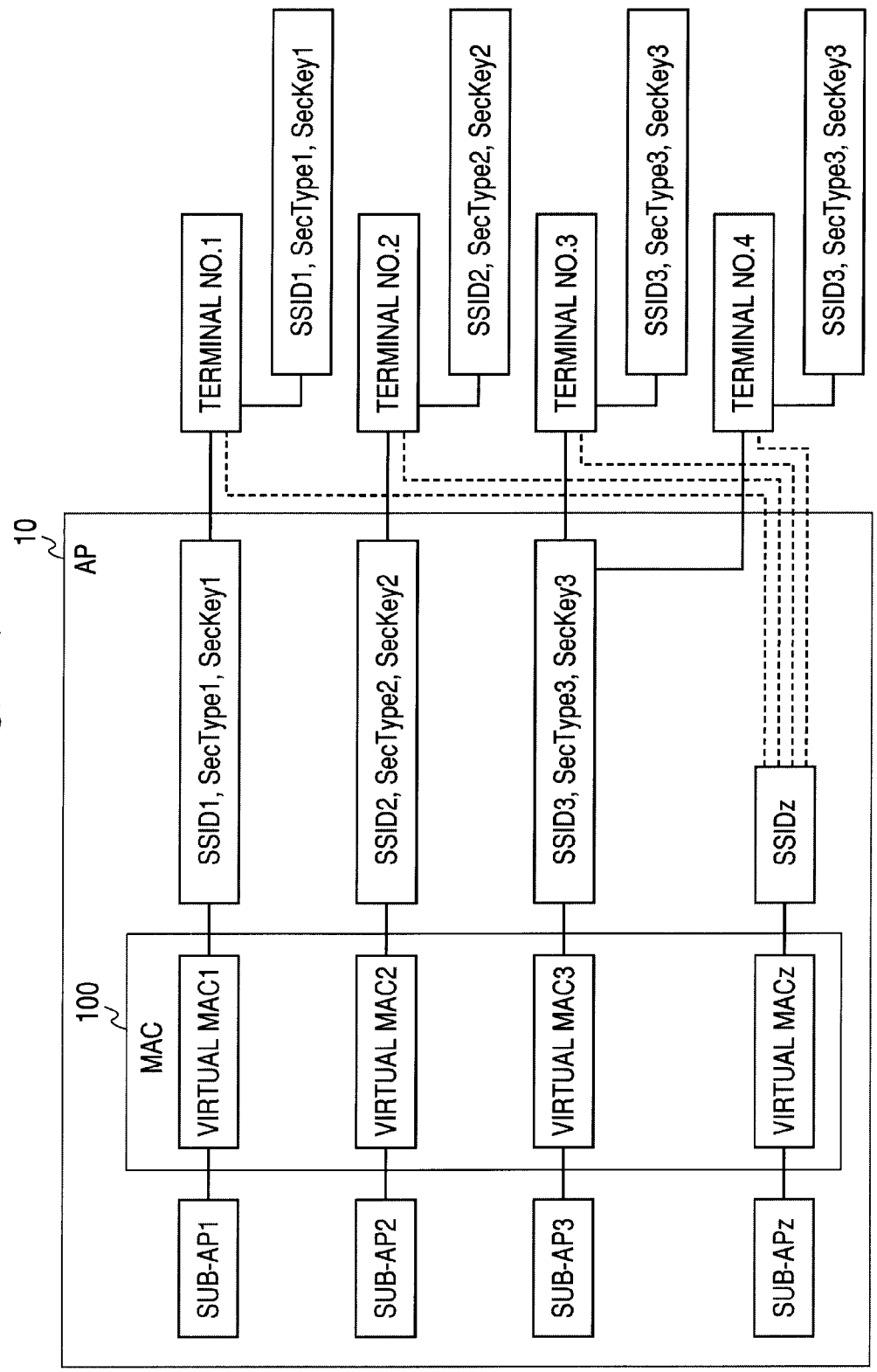
FIG. 4 is a block diagram for describing a plurality of virtual sub-APs multiplexed in connection with the type of an encryption scheme and a plurality of terminals wirelessly connected to the sub-APs.

In the AP 10, the ROM 52 has software (a program) stored thereon and executed by the CPU 50 for implementing MAC. As shown in FIG. 4, when the software is executed by the CPU 50, the computer of AP 10 provides a Media Access Controller 100 (hereinafter referred to as "MAC 100") as a hardware component.

As shown in FIG. 4, one MAC 100 is physically provided but operable as a plurality of virtual media access controllers (hereinafter referred to as "virtual MACs"). FIG. 4 shows an example to provide four virtual MACs, i.e., "virtual MAC1," "virtualMAC2," "virtualMAC3," and"virtualMACz." The virtual MAC1, MAC2 and MAC3 are used for normal wireless communication such as data communication with the terminal. The virtual MACZ operates during an exchange of security information for a negotiation of security information in a register mode to register an additional terminal to the wireless LAN. The MAC 100 is operable on the CPU 50 to processes data for the virtual MAC1, MAC2, MAC3 and MACZ in a time sharing manner to allow the virtual MAC1, MAC2, MAC3 and MACz to operate substantially in parallel. The virtual MAC1, MAC2 and MAC3 are operable to perform encrypted communication using encryption schemes respectively selected thereto (e.g., different encryption schemes can be selected). As a matter of course, all the virtual MAC1 to MACZ are provided within the housing 40.

As shown in FIG. 4, the AP 10 is operable as a plurality of virtual sub-access points (hereinafter referred to as "sub-APs") that apparently independently operable after the software for implementing MAC is installed on the AP 10. Specifically, in the present embodiment, a plurality of sub-APs are virtually multiplexed to the AP 10 to perform actual communication with terminals 20, 22 and 24. The sub-AP1, sub-AP2 and sub-AP3 can perform encryption communication with encryption schemes independently selected for the respective sub-AP1, sub-AP2 and sub-AP3.

The number of sub-APs (four in the embodiment shown in FIG. 4 and are hereinafter referred to as "sub-AP1," "sub-AP2," "sub-AP3" and "sub-APz") are equal to the virtual MAC1 to MACZ. That is, the sub-AP1 to sub-APz correspond to the virtual MAC1 to MACz, respectively. Therefore, the sub-AP1, sub-AP2 and sub-AP3 can perform the normal wireless communication, and the sub-APz can exchange the security information. Hereinafter, the sub-AP1, sub-AP2 and sub-AP3 are referred to as "normal sub-AP," and the sub-APz is referred to as "key exchange special sub-AP."

In the present embodiment, the security level information is exchanged before a selection of the security level between the respective terminals 20, 22 and 24 and the AP 10 in order to obtain information required to select an encryption scheme for each of the normal sub-APs.

When the security level information is exchanged, it is convenient if the number of access points as viewed from the terminal is singular. In the present embodiment, the key exchange sub-APz dedicated to exchanging security level information (e.g., exchanging a key) is provided in addition to the normal sub-APs 1 to 3. The key exchange sub-APz is commonly used in key exchange procedures for the normal sub-APs 1 to 3. The key exchange sub-APz is operated by means of the virtual MACZ.

<Individual Selection of the Encryption Scheme>

As shown in FIG. 4, an SSID (Service Set ID) is assigned to each of the sub-APs as a identifier unique thereto. The terminal 20, 22 and 24 can identify each of the sub-APs distinguishably based on the SSIDs received from the respective sub-APs. For each of the normal sub-APs 1 to 3, the type of an encryption scheme (represented by "SecType" in FIG. 4) and a value of an encryption key (represented by "SecKey" in FIG. 4) adopted by the normal sub-APs 1 to 3 and SSID are associated with one another. Likewise, for each terminal, the SSID of a sub-AP used by each of the terminals 20, 22 and 24, the type of an encryption scheme adopted by each of the terminals 20, 22 and 24, and the value of an encryption key adopted by each of the terminals are associated with one another.

In the embodiment shown in FIG. 4, the normal sub-AP1 using the virtual MAC 1 is assigned to one terminal No. 1; the normal sub-AP2 using the virtual MAC 2 is assigned to one terminal No. 2; and the normal sub-AP3 using the virtual MAC 3 is assigned to two terminals No. 3 and No. 4 that support different highest security levels.

Before establishing a wireless LAN communication with the respective terminals 20, 22 and 24, the AP 10 selects an encryption scheme for each of virtual MAC1, MAC2 and MAC3. The encryption scheme is selected from the encryption schemes assigned to the corresponding one of virtual MAC1, MAC2 and MAC3 such that the selected encryption scheme is matched with the encryption schemes supported by the terminal 20, 22 and/or 24 to be connected to the corresponding one of normal sub-APs 1 to 3.

Specifically, the virtual MAC 1, MAC2 and MAC3 support a plurality of encryption schemes that are respectively associated with different security levels, and one or more encryption schemes of the plurality of encryption schemes are assigned to each of the virtual MAC1, MAC2 and MAC3 to allow each of the virtual MAC1, MAC2 and MAC3 to perform wireless communication using one of the assigned encryption schemes. That is, one of the security level of an encryption scheme finally adopted by each of the virtual MAC1, MAC2 and MAC3 is selectable. The AP 10 is designed to select, for each of the normal sub-APs 1 to 3 (i.e., for each of the virtual MAC1, MAC2 and MAC3), any one from the assigned encryption schemes in accordance with the security levels of the encryption schemes supported by the terminal attempted to be wirelessly connected to the corresponding one of virtual MAC1, MAC2 and MAC3.

For example, the plurality of encryption schemes include AES, TKIP, WEP 128, and WEP 64, all of which are defined in the standard IEEE 802.11. All of the encryption schemes are encryption techniques of a secret key encryption that uses one secret key to both encrypt and decrypt data. The four types of encryption schemes are defined such that a security level decreases in a listed sequence. That is, as the security level approaches the WEP 64, vulnerability of data to be transferred increases, and as the security level approaches AES, the confidentiality of data to be transferred increases conversely.

In the example shown in FIG. 5A, one or more selectable encryption schemes are assigned to each of the normal sub-APs 1 to 3, such that highest security levels of the encryption schemes assigned to the respective normal sub-APs 1 to 3 are different from one another.

As shown in FIG. 5A, only AES (the encryption scheme having the highest security level) is assigned as a selectable encryption scheme to the normal sub-AP1. Only TKIP (the encryption scheme having the highest security level) is assigned as a selectable encryption scheme to the normal sub-AP2. Two types of WEP 128 and WEP 64 (the WEP 128 has higher security level) are assigned as selectable encryption schemes to the normal sub-AP3, respectively.

Accordingly, one or more selectable encryption schemes are assigned to each of the normal sub-APs 1 to 3 such that the types of the encryption schemes having the highest security levels in the respective normal sub-APs 1 to 3 are different from one another.

Consequently, when an encryption scheme to be finally adopted by one terminal (a new additional terminal to connect to a wireless LAN to which one AP 10 belongs) is selected as an encryption scheme both supported by the AP 10 and the one terminal, one of the plurality of normal sub-APs having the encryption capability conforming to the encryption capability of the terminal can be selected as a normal sub-AP to which the terminal should be wirelessly connected.

So long as the user selects the normal sub-AP for another terminal similarly, it is possible to prevent a connection between a plurality of terminals having greatly-different encryption capabilities and the same normal sub-AP. Consequently, when a plurality of terminals are connected to the AP 10, the security levels of the encryption schemes to be finally adopted by one terminal is prevented from decreasing to a security level conforming to the encryption capability of another terminal having the lowest encryption capability.

When the plurality of terminals having greatly-different encryption capabilities is connected to the AP 10, the user can assign the terminals to a plurality of normal sub-APs having different encryption capabilities in consideration of the encryption capabilities of the terminals. According to the assignment, the plurality of terminals can be connected to the AP 10 (one master unit) without sacrificing the encryption capabilities of the respective terminals.

The number of encryption schemes to which the respective normal sub-APs is assigned may be one or plural. When one encryption scheme is assigned, the type of a terminal allowed to be connected to the normal sub-AP is limited to the type of the one encryption scheme. In contrast, there is prevented occurrence of a decrease in the security level finally adopted by the normal sub-AP, which would otherwise be caused by the security level of a terminal connected to the normal sub-AP.

Assigning the encryption schemes to the normal sub-APs 1 to 3 is not limited to the example shown in FIG. 5A. The encryption schemes may be arbitrary assigned to the normal sub-APs. For example, as shown in FIG. 5B, AES is assigned to the normal sub-AP 1, TKIP is assigned to the normal sub-AP 2, and TKIP, WEP 128 and WEP 64 are assigned to the sub-AP 3. That is, highest levels may not be different among the normal sub-APs 1 to 3. Further, a set of encryption schemes having different security levels (e.g., AES, TKIP, WEP 128, and WEP 64) may also be assigned as selectable encryption schemes to at least one of the normal sub-APs 1 to 3.

The hardware of the AP 10 may be configured such that each of the sub-APs is operable to support predetermined encryption schemes on the hardware. For example, the hardware may allow each of sub-APs 1 to 3 to support AES, TKIP, WEP 128, and WEP 64. One or more selectable encryption schemes of the predetermined encryption schemes may be assigned to each sub-AP before or after shipment. That is, the selectable encryption schemes may be previously assigned to each sub-AP according to by the manufacturer or may be assigned by the user.

FIGS. 5A and 5B shows four terminals to be wirelessly connected to the AP 10 are arranged in sequence from top to bottom in which encryption capability decreases, and are assigned to three normal sub-APs whose encryption capabilities are sequentially decreased in this sequence.

In the examples of FIGS. 5A and 5B, the terminal No. 1 having the highest encryption capability is assigned to the normal sub-AP1 having the highest encryption capability. The terminal No. 2 having the second highest encryption capability is assigned to the normal sub-AP2 having the second highest encryption capability. The terminal No. 3 having the third highest encryption capability and the terminal No. 4 having the lowest encryption capability are assigned to the normal sub-AP3 having the lowest encryption capability (FIG. 5A) or the second highest encryption capability (FIG. 5B).

In this embodiment, assignment of the terminals to the normal sub-APs is performed by the user, but the assignment may be automatically performed by the CPU 50 by execution of a specific program thereon.

In FIGS. 5A and 5B, the encryption schemes (security level) enclosed by square frames indicate the encryption scheme selected for use in the wireless communication between the normal sub-APs and the terminals. The selected encryption scheme is determined from encryption schemes available on both the normal sub-AP and the terminal (i.e., the encryption schemes assigned to the normal sub-AP and supported by the terminal), and the highest available security level between the normal sub-AP and the terminal is finally selected. An encryption scheme used in a wireless communication between one normal sub-AP and a terminal is selected regardless of an encryption scheme used in a wireless communication between another normal sub-AP and another terminal. That is, the security level finally adopted by the terminal No. 1 is determined regardless of security levels supported by other terminals No. 2 to No. 4. Further, the security level finally adopted by the terminal No. 2 is also determined likewise regardless of security levels supported by other terminals No. 1, No. 3 and No. 4. This is because that the terminals No. 1 and No. 2 do not share the same normal sub-AP with any other terminals.

The security level finally adopted by the terminal No. 3 is determined regardless of the security levels supported by the terminals No. 1 and No. 2 but must be determined in consideration of the security level supported by the terminal No. 4.

Likewise, the security level finally adopted by the terminal No. 4 is determined regardless of the security levels supported by the terminals No. 1 and No. 2 but must be determined in consideration of the security level supported by the terminal No. 3. This is because that the terminals No. 3 and No. 4 having different encryption capabilities share the same normal sub-AP (sub-AP3) to which plural types (two: FIG. 5A, three: FIG. 5B) of encryption schemes are assigned.

Although the highest available security level between the normal sub-AP and the terminal is selected in this embodiment, the method of selecting the security level is not limited thereto. Several specific example techniques of determining a security level to be finally adopted by the respective terminals 20, 22 and 24 are described in detail in U.S. application Ser. No. 10/956,266 (published as US 2005/0132193 A1) and U.S. application Ser. No. 11/103,007 (published as US 2005/0238172 A1), the entire contents of which are incorporated herein by reference.

<Software Configuration of AP>

The ROM 52 shown in FIG. 2 has various types of program and data for executing the program stored thereon to communicate with the terminals 20, 22 and 24 in the wireless LAN 30 and access to the Internet 34. The program and the data may be previously stored on the ROM 52.

Specifically, the programs stored on the ROM 52 include (a) the program (not shown) for implementing MAC; (b) a connection establishment program (the process is shown in FIG. 6) executed by the CPU 50 to establish a connection with the terminals 20, 22 and 24; and (c) a MAC address register program (not shown) executed by the CPU 50 in order to register the MAC addresses previously assigned to the respective terminals 20, 22 and 24 to the respective normal sub-APs. The registered information of MAC address in association with the corresponding normal sub-AP is stored on the storage device 56.

The connection establishment program shown in FIG. 6 includes: (a) an encryption scheme selection module executed by the CPU 50 to select an encryption scheme for each normal sub-AP; (b) an encryption key setting module executed by the CPU 50 to set, for each normal sub-AP, an encryption key to be finally adopted; and (c) a activation control module executed by the CPU 50 to control activation and deactivation of each of the sub-APs independently.

<Hardware Configuration of Terminal>

Figure 3B:
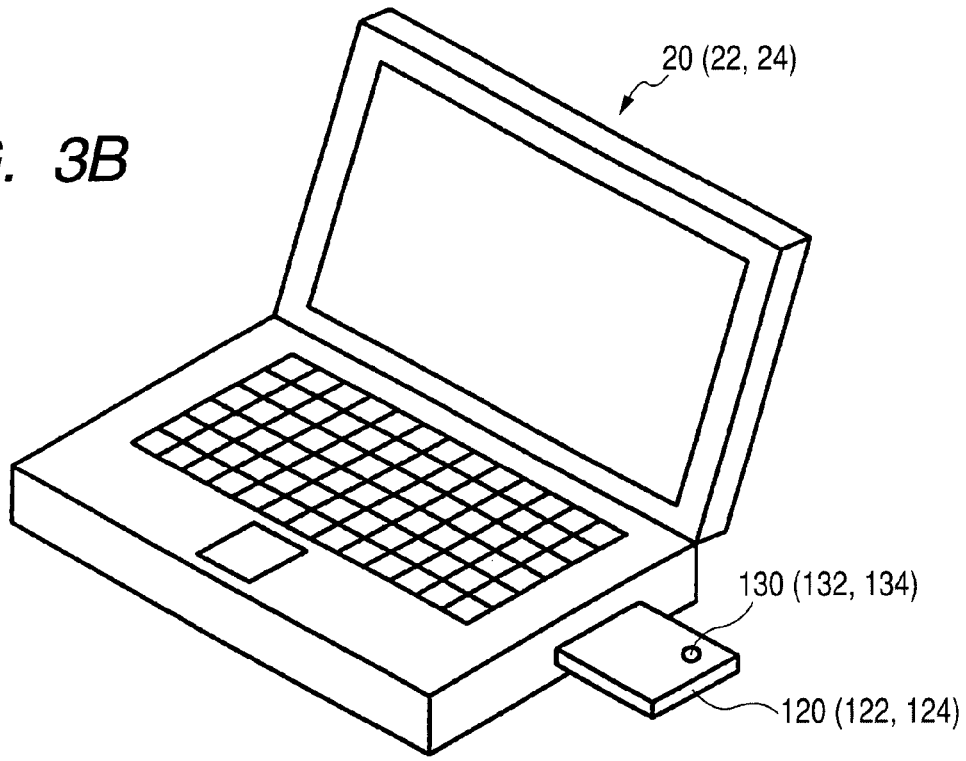
FIG. 3B is a perspective view showing one of the terminals shown in FIG. 1 with an adaptor for use in connection with a wireless LAN attached to the terminal.
Figure 3C:
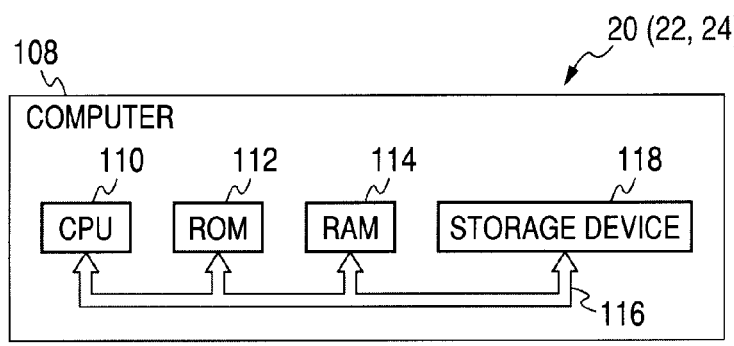
FIG. 3C is a schematic block diagram showing the hardware configuration of a computer that configures the main unit of the terminal shown in FIG. 3B.

As shown in FIG. 3C, each of the terminals 20, 22 and 24 includes a computer 108. The computer 108 includes a CPU 110, ROM 112 and RAM 114 which are interconnected by a bus 116. Each of the terminals 20, 22 and 24 also includes a hard disk serving as a storage device 118 and a CD-ROM drive.

As shown in FIG. 1 and FIG. 3B (FIG. 3B shows only one terminal 20), wireless LAN adaptors 120, 122 and 124 are removably attached to the respective terminals 20, 22 and 24. The wireless LAN adapters 120, 122 and 124 are operable as wireless LAN connection devices capable of transmitting/receiving radio waves to/from the AP 10.

Device drivers of the respective wireless LAN adaptors 120, 122 and 124 are installed in the corresponding terminals 20, 22 and 24, respectively, whereby the respective terminals 20, 22 and 24 can recognize and control the attached wireless LAN adaptors 120, 122 and 124. MAC addresses that are unique identification numbers are previously (inherently) assigned to the respective wireless LAN adaptors 120, 122 and 124.

As shown in FIG. 3B, one-touch register buttons 130, 132, and 134 are attached to the respective wireless LAN adaptors 120, 122 and 124. The CPU 100 of each of the terminals 20, 22 and 24 can detect pressed states of the corresponding one of the register buttons 130, 132 and 134. Accordingly, when the use presses the one-touch register button 130 (132, 134), the CPU 110 can detect an input from the one-touch register button 130 (132, 134).

<Software Configuration of the Terminal>

A specific utility program is installed on the ROM 112 of each of the terminals 20, 22 and 24 prior to the connection with the wireless LAN 30. The utility program includes: (a) an encryption scheme selection module executed by the CPU 110 to select an encryption scheme to be finally adopted (for use in the wireless communication) from encryption schemes that the terminal 20 (22, 24) supports; and (b) an encryption key setting module executed by the CPU 110 to set a selected encryption key used in the wireless communication, i.e., an encryption key to be finally adopted.

<Connection Establishment>

With reference to FIGS. 6A and 6B, the process executed by the AP 10 and the terminals 20, 22 and 24 for establishing the connection between the AP 10 and the terminals 20, 22 and 24 will be described in detail. The connection process with reference to FIGS. 6A and 6B will be described only in case of establishing the connection between the AP 10 and the terminal 20 is established. However, the connection between the AP 10 and the terminal 22 or 24 can be established by the connection process. Here, a terminal of the terminals 20, 22 and 24 tried to establish the connection with the AP 10 is referred to as a "target terminal." Therefore, in the following description, the target terminal is the terminal 20.

The connection process can be initiate by operating the one-touch register button 130 associated with the target terminal 20 and the one-touch register button 80 of the AP 10 in a state where the target terminal 20 and the AP 10 are located within a predetermined distance.

The user can select a target sub-AP from a plurality of virtually-multiplexed normal sub-APs by operating an operation unit (not shown). When the AP 10 receives the input from the operation unit, the AP 10 selects the designated normal sub-AP as a target sub-AP. Thereafter, when the user operates the one-touch register button 80, the target sub-AP initiates the connection process to be connected with only one of the terminals 20, 22 and 24 (in this example, the target terminal 20) at a time (at one connection process).

Therefore, when all the plurality of terminals 20, 22 and 24 are eventually necessitated to connect with the single target sub-AP, every time the user operates both the one-touch register button 80 and the one-touch register button (130, 132 or 134) of the one terminal selected by the user from the plurality of terminals 20, 22 and 24, the selected terminal 20, 22 or 24 is connected to the single target sub-AP one at a time.

However, the target sub-AP may request to connect with the plurality of terminals 20, 22 and 24 at one time in response to the input from the one-touch register button 80.

In the example shown in FIG. 5A, one or more encryption schemes are assigned to each of the normal sub-APs such that the types of the encryption schemes having the highest security level in the respective normal sub-APs are different from one another. Therefore, the user can select any one of the normal sub-APs as a target sub-AP in consideration of a security level to conform to the target terminal, i.e., the encryption capability of the target terminal. For example, the user can select the target sub-AP according to technique shown in FIG. 5A and related description.

The flowchart of FIG. 6A shows connection process performed by the terminal 20, which corresponds to the process when the CPU 110 of the terminal 20 executes the encryption scheme selection module and the encryption key setting module. In contrast, the flowchart of FIG. 6B shows connection the process performed by the AP 10, which corresponds to the process when the CPU 50 executes the encryption scheme selection module, the encryption key setting module and the activation control module.

When the user of the target terminal 20 hopes to initiate the connection with the AP 10, the user of the target terminal 20 operates the one-touch register button 130 provided at the wireless LAN adaptor 120 attached to the target terminal 20 and the one-touch register button 80 of the AP 10.

At step S100, when the CPU 110 of the target terminal 120 detects an input from the one-touch register button 130, the target terminal 120 enters the one-touch register mode at step S101.

When the one-touch register mode is entered, the target terminal 120 specifies the MAC address of the wireless LAN adaptor 120 and creates a packet formed by adding the MAC address as header information to data that request for register to the wireless LAN 30, and then the target terminal 120 transmits the packet to the connectable access point(s). When the access point receives the MAC address, the access point registers the received MAC address.

Subsequently, at step S102, the target terminal 120 determines whether a predetermined time period has elapsed since completion of step S101. If the predetermined time period has not elapsed (Step S101: NO), the target terminal 120 at step S103 searches an access point on the one-touch register mode.

When only the AP 10 is connectable to the target terminal, the target terminal 120 eventually determines whether the AP 10 has entered the one-touch register mode. In the present embodiment, the AP 10 on the one-touch register mode virtually acts as one key exchange special sub-APz, and the key exchange special sub-APz transmits a specific beacon.

When the target terminal 102 receives the transmitted beacon, the target terminal 120 determines that there is the access point the one-touch register mode (the AP 10 (=the key exchange special sub-APz)) (step S103: YES). When the result of step S103 is NO, the process returns to step S102. When the target terminal 102 determines the result of step S103 is YES before the elapsed time since completion of step S101 exceeds the predetermined time period, the process proceeds to step S104; otherwise (step S102: NO) the process proceeds to step S112 at which the target terminal 102 exits the one-touch register mode and the current connection process is terminated.

At step S104, the target terminal try to connect with the AP 10 on the one-touch register mode. Subsequently, at step S105, it is determined whether the number of connection retries has exceeded a predetermined number of times and another retry should be performed. If the number of retries exceeds the predetermined number of times (step S105: YES), the process proceeds to step S112 to exit the one-touch register mode.

When the target terminal 20 is successfully connected with the AP 10 on the one-touch register mode without the number of retries exceeding the predetermined number of times (S105: YES), the process proceeds to step S106.

At step S106, the target terminal 20 exchanges packets including security level information with the AP 10 (specifically, the key exchange special sub-APz). Specifically, the target terminal 20 negotiates the types of encryption schemes, i.e., encryption capability of the encryption scheme, with the AP 10 in order to obtain the encryption schemes supported by the AP 10.

Subsequently, at step S107, it is determined whether the packet exchange subroutine is completed. If the packet exchange subroutine has not yet been completed, the process returns to step S106. If the packet exchange subroutine is completed, the process proceeds to step S108. Therefore, as a result that the procedures of step S106 are repeatedly carried out a required number of times, the packet exchange subroutine is completed.

On the other hand, in the connection process in AP 10, the CPU 50 of the AP 10 detects an input of the one-touch register button 80 operated by the user at step S200, and the AP 10 enters the one-touch register mode at step S201.

Figure 7:
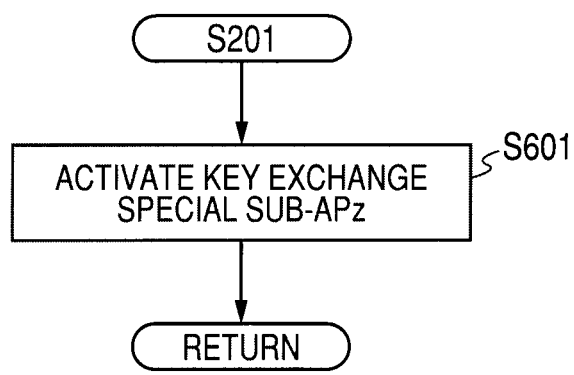
FIG. 7 is a flowchart schematically showing details of step S201 shown in FIG. 6.

As shown in FIG. 7, the AP 10 enters the one-touch register mode, the key exchange special sub-APz is activated at step S601 as shown in FIG. 7. Then, the key exchange special sub-APz is made effective, and the key exchange special sub-APz transmits the specific beacon. Further, when the key exchange special sub-APz receives the packet including the MAC address of the target terminal 20 from the target terminal, the target terminal 20 registers the received packet.

Subsequently, at step S202 shown in FIG. 6B, AP 10 determines whether the predetermined time period has elapsed since completion of step S201. If the predetermined time period has not elapsed (S202, No), step S203 is performed substantially simultaneously with step S106. In contrast, if the predetermined time period has elapsed since completion of step S201 (step S202: NO), the process proceeds to step S208 at which the AP 10 exits the one-touch register mode. In this case, the current connection process is terminated.

At step S203, the AP 10 (the key exchange special sub-APz) exchanges a packet including security level information with the target terminal 20. Specifically, the AP 10 negotiates the types of encryption schemes, i.e., encryption capability of the encryption scheme, with the target terminal 20 to obtain the encryption schemes supported by the target terminal 20.

Subsequently, at step S204, it is determined whether the packet exchange subroutine is completed. If the packet exchange subroutine has not yet been completed, the process returns to step S202. In contrast, if the packet exchange subroutine is completed, the process proceeds to step S205. Therefore, as a result that the procedures of step S203 is repeatedly carried out a required number of times, the packet exchange subroutine is completed.

As described above, steps S106 and S203 are performed substantially at the same time by the target terminal 20 and the AP 10 (the key exchange special sub-APz), whereby packets including security level information are exchanged between the target terminal 20 and the AP 10.

<Exchange of Security Level Information>

The following are detailed time-series descriptions for packet exchange subroutine at steps S106 and S203 to exchange on security level information between the target terminal 20 and the AP 10. FIG. 8A and FIG. 8B are flowcharts showing details of step S106 and step S203, respectively.

Sub-Step S1

First, the target terminal 20 transmits a request to the AP 10 to prepare security information.

Sub-Step S2

Next, when the AP 10 receives the request, the AP 10 transmits a reply to the target terminal as a response to the request. The AP 10 also determines SecType representing the type of an encryption scheme and SecKey representing the value of an encryption key with regard to each of all the plurality of encryption schemes assigned to the target sub-AP. As a result, security information (i.e, information about the type of selectable encryption schemes) is prepared.

In this embodiment, as mentioned above, the AP 10 is virtually multiplexed as a plurality of normal sub-APs such that the AP 10 can perform actual communication with the respective terminals 20, 22 and 24 using different types of encryption schemes. That is, the AP 10 can operate in a multi-AP mode.

Sub-Step S3

Subsequently, the target terminal 20 transmits data representing the type of encryption scheme supported by the target terminal to the AP 10. For example, as indicated by the terminal No. 1 in FIGS. 5A and 5B, when the target terminal supports AES, TKIP, WEP 128 and WEP 64, the target terminal 20 transmits data representing the types of these four encryption schemes to the AP 10.

Sub-Step S4

The AP 10 specifies encryption schemes supported by the target terminal 20 based on the received data from the target terminal 20. Then, the AP 10 retrieves the encryption schemes that are assigned to the target sub-AP and also supported by the target terminal 20 from the assigned encryption schemes, and determines the retrieved encryption schemes as encryption schemes available for the wireless communication between the target sub-AP and the target terminal 20.

For example, as shown in FIGS. 5A and 5B, when the encryption scheme assigned to the normal sub-AP is only AES and when the target terminal supports AES, TKIP, WEP 128 and WEP 64 as indicated by the terminal No. 1, an available encryption scheme common to both the target sub-AP and the target terminal is only AES. Therefore, in this case, the available encryption scheme of the target sub-AP is retrieved and determined to only AES due to the specification of the target terminal.

Foregoing is the security information packet exchange subroutine performed by the target terminal 20 at step S106 and the AP 10 at step S203. During the course of packet exchange subroutine, the target terminal 20 and the AP 10 specify MAC addresses with each other and perform encrypted communication with each other.

As shown in FIG. 6B, after completion of the packet exchange subroutine, the process proceeds to step S205 at which the AP 10 sets the security level information with regard to the target sub-AP.

Details of step S205 are shown in FIG. 8B. At step S401, the AP 10 (the target sub-AP) selects a candidate encryption scheme that is a candidate for an encryption scheme to be finally adopted. In this step, the AP 10 selects an encryption scheme having the highest security level among types of encryption schemes reported by the target terminal 20 as the candidate encryption scheme.

For example, when AES, TKIP, WEP 128, and WEP 64 are reported as encryption schemes by the target terminal 20, since the encryption scheme having the highest security level corresponds to AES, and AES is selected as the candidate encryption scheme at step S401.

Subsequently, at step S402, the target sub-AP compares the security level of the candidate encryption scheme selected at step S401 with a current highest security level. The "current highest security level" is an encryption scheme that has been set to the target sub-AP.

When the target sub-AP has first exchanged security information packets with the target terminal 20, no encryption scheme is set to the sub-AP. Therefore, the target sub-AP selects the encryption scheme having the highest security level from the encryption schemes reported by the target terminal.

However, when the target sub-AP has not first exchanged security information packets with the target terminal 20, the security level of the encryption scheme having been set to the target sub-AP may be lower than the highest available level determined at step S203 due to the encryption scheme of other terminal having been wirelessly connected to the target sub-AP. Therefore, the security level of the encryption scheme reported by the target terminal does not always match the current highest security level.

If the security level of the candidate encryption scheme is higher than the current highest security level (step S402: YES), at step S403, the encryption scheme is maintained to the encryption scheme currently set. Consequently, the security level of the target sub-AP is maintained at the current highest security level.

For example, as shown in FIG. 5B, when the target sub-AP is sub-AP3, to which three types of encryption schemes (TKIP, WEP 128, and WEP 64), and there are two target terminals including the terminal No. 3 supporting TKIP, WEP 128, and WEP 64 and the terminal No. 4 supporting WEP 128 and WEP 64, the available encryption scheme common to the target sub-AP and the target terminals No. 3 and 4 includes two types, i.e., WEP 128 and WEP 64. Therefore, in order to connect both terminals No. 3 and 4 to the sub-AP3, the available encryption scheme of the target sub-AP is narrowed to two types; namely, WEP 128 and WEP 64, due to the specification of the target terminals. Accordingly, in this case, the encryption scheme having available highest level is WEP 128 which is to be finally adopted. When the terminal No. 4 has already been connected to the sub-AP3 (that is, WEP 128 has been set to the sub-AP3 as the current highest security level) and the current target terminal is the terminal No. 3, the highest security level supported by the terminal No. 3 is TKIP but it is higher than the current highest security level (WEP 128). Therefore, according to the step 403, the current highest security level (WEP 128) is selected.

In contrast, if the security level of the candidate encryption scheme is not higher than the current highest security level (S402: NO), at step S404, the target sub-AP adopts the candidate encryption scheme.

Incidentally, details of the procedure during steps S402 to S404 reflect a policy to set a security level. Therefore, the selection method for setting the security level is not limited to this embodiment, and any other method may be applicable. For example, the incorporated U.S. application Ser. No. 10/956,266 and Ser. No. 11/103,007 describes examples to setting the security level based on the various security policies.

When the AP 10 completes security information packet exchange subroutine, security information is set at step S205 to reflect a result of step S203.

Specifically, there is set information to indicate that: (a) the type of an encryption scheme determined at step S403 or S404 (see FIG. 8) corresponds to the type of an encryption scheme finally adopted for encrypted communication established between the target sub-AP and the target terminal 20; and (b) an ID of a target terminal corresponding to the type of the encryption scheme (i.e., a station ID) and the value of an encryption key are adopted for encryption and decryption for subsequent wireless communication. The information set at step S205 is stored on the storage device 56. The information may be stored in association with the SSID of the target sub-AP as security setting information.

Subsequently, the process proceeds to step S206 shown in FIG. 6 to perform activation control subroutine for each sub-AP.

Figure 9:
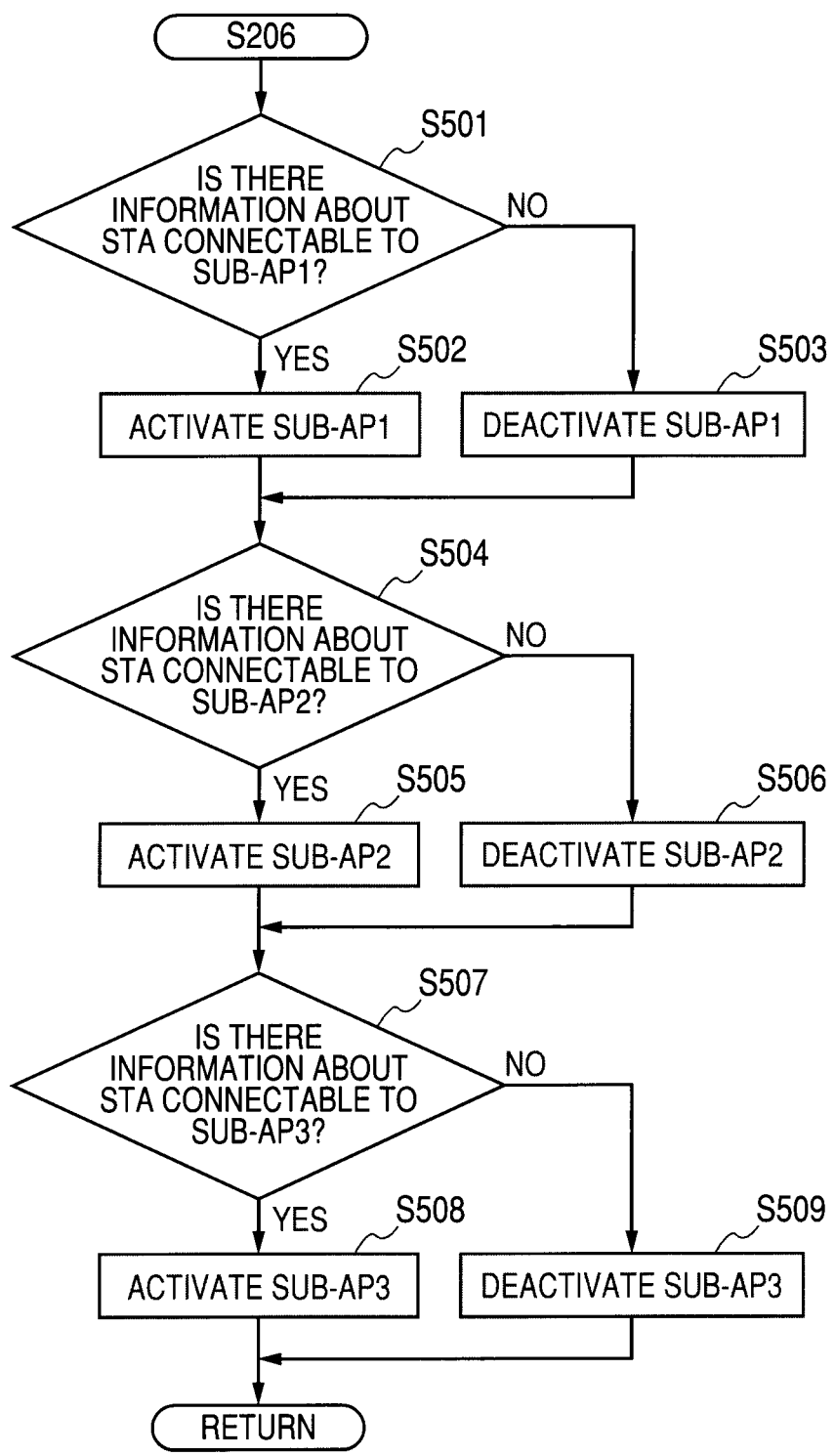
FIG. 9 is a flowchart schematically showing details of step S206 shown in FIG. 6.

Details of the subroutine at step S206 are schematically explained in a flowchart shown in FIG. 9. At S501, it is determined whether there is information on a terminal connectable to the normal sub-AP1. Specifically, it is determined whether there is MAC address of the terminal registered in association with the normal sub-AP1 which is stored on the storage device 56. If there is the information, the normal sub-AP1 is activated at step S502. In contrast, if there is no information, the normal sub-AP1 is deactivated at step S503.

Likewise, at step S504, it is determined whether there is information on a terminal connectable the normal sub-AP2. If there is information, the normal sub-AP2 is activated at step S505. If there is not information, the normal sub-AP2 is deactivated at step S506.

Still further, at step S507, it is determined whether there is information on a terminal connectable to the normal sub-AP3. If there is information, the normal sub-AP3 is activated at step S508. If there is not information, the normal sub-AP3 is activated at step S509.

When step S206 shown in FIG. 6 is completed, the operation mode of the AP 10 is switched at step S207 from the one-touch register mode to the normal wireless communication mode for each of the activated normal sub-APs. If the result of step S202 is YES, the AP 10 likewise exits the one-touch register mode at step S208. In this case, however, the one-touch register mode is exited in a state where neither packet exchange nor register of a security level are completed.

In contrast, when the packet exchange subroutine is completed by the target terminal, it is determined step S108 whether the time elapsed since the result of the determination at step S107 became YES has exceeded a predetermined time period. If the elapsed time has not exceeded the predetermined time period (S108: NO), it is determined at step S109 whether a normal sub-AP on the wireless communication mode is found from the activated normal sub-APs based on the security information received by the AP 10.

Specifically, the target terminal 20 obtains an SSID of the accessible normal sub-AP. This process is performed in conformance with communication specifications specified in the standard IEEE 802.11. Accordingly, the specific beacon includes an SSID of the normal sub-AP. Upon receipt of a specific beacon transmitted from the normal sub-AP, the target terminal 20 can obtain the SSID of the currently-accessible normal sub-AP. The target terminal 20 compares the obtained SSID of the normal sub-AP with the previously-received security information. As a result of the comparison, the target terminal 20 specifies the encryption scheme adopted by the normal sub-AP for establishing communication (encryption and decryption) with the target terminal 20 and the value of an encryption key are specified.

If the time elapsed since the completion of step S107 exceeds the predetermined time period (step S108: YES) in a state where a normal sub-AP activated and on a wireless communication mode cannot be found, the AP 10 exits the current one-touch register mode at step S112.

In contrast, if a normal sub-AP activated and on a wireless communication mode can be found before the time elapsed since the completion of step S107 exceeds the predetermined time period (step S109: YES), the process proceeds to step S110.

At step S110, the security information received from the normal sub-AP is set in the target terminal 20 in conformance with the state of the found normal sub-AP. Consequently, the target terminal 20 performs subsequent encryption and decryption using the type of the encryption scheme and the value of the encryption key included in the security information received from the normal sub-AP.

Subsequently, at step S111, the target terminal 20 is connected to the found normal sub-AP. The target terminal 20 subsequently starts a connection monitoring mode for periodically monitoring the connection state with the normal sub-AP.

The incorporated U.S. application Ser. No. 10/956,266 and Ser. No. 11/103,007 describes some examples for monitoring the connection state. Therefore, repeated descriptions of the techniques are omitted.

<Deactivate of the Sub-AP After Initial Setting>

The ROM 52 of the AP 10 has sub-AP deactivation program stored thereon and readable by the CPU 50.

According to the execution of the sub-AP deactivation program, after establishing connections with at least one of the terminals 20, 22 and 24 in response to the first operation of the one-touch register button 80, that is, after completing the first negotiation of the type of the encryption scheme to be adopted by the respective terminals, the AP 10 periodically monitors the connection state with each of the terminals 20, 22 and 24. During the monitor of the connection state, the AP 10 is deactivates the operation of a sub-AP that is not connected to any of the terminals 20, 22 and 24.

Figure 10:
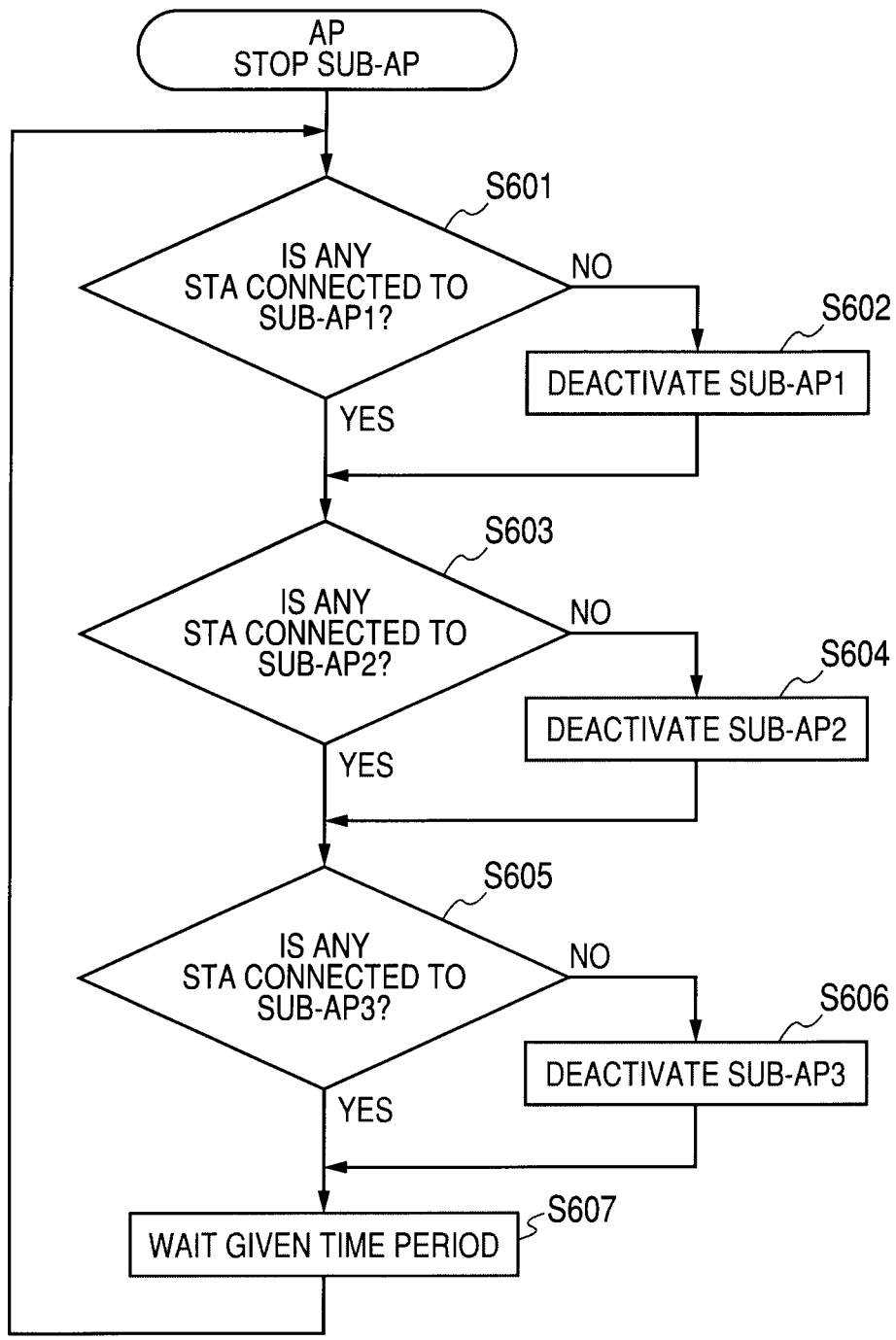
FIG. 10 is a flowchart schematically showing a sub-AP activation program executed by the wireless LAN access point shown in FIG. 1.

FIG. 10 is a flowchart schematically showing the sub-AP deactivate program. When the AP deactivation program is launched, it is determined at step S601 whether the normal sub-AP1 is in connection with at least one of the terminals 20, 22 and 24. If the normal sub-AP1 is not connected to any one of the terminals 20, 22 and 24 S601: NO), the AP 10 deactivates the normal sub-AP1 at step S602.

In contrast, if at least one of the terminals 20, 22 and 24 is in connection with the normal sub-AP1 (step S601: YES), the process skips step S602 and proceeds to step S603.

At step S603, it is determined whether at least one of the terminals 20, 22 and 24 is in connection with the normal sub-AP2. If the normal sub-AP2 is not connected to any one of the terminals 20, 22 and 24 (step S603: NO), the AP 10 deactivates the normal sub-AP2 at step S604.

In contrast, if at least one of the terminals 20, 22 and 24 is in connection with the normal sub-AP2 step S603: YES), the process skips step S604 and proceeds to step S605.

At step S605, it is determined whether the normal sub-AP3 is in connection with at least one of the terminals 20, 22 and 24. If the normal sub-AP3 is not connected to any one of the terminals 20, 22 and 24 (step S605: NO), and the AP 10 deactivates the normal sub-AP3 at step S606.

In contrast, if at least one of the terminals 20, 22 and 24 is in connection with the normal sub-AP3 (step S605: YES), the proceeds skips step S606 and proceeds to step S607.

At step S607, the AP 10 waits a given time period. Subsequently, the AP 10 again performs steps S601 to S606. Steps S601 to S607 are repeated until the power of the AP 10 is turned off. Consequently, the connection state with the respective terminals 20, 22 and 24 is periodically monitored for each of the normal sub-APs.

According to the execution of the sub-AP deactivation program, after establishment of a connection between the AP 10 and the plurality of terminals 20, 22 and 24 in response to first operation of the one-touch register button 80, in case where at least one of the terminals 20, 22 and 24 exits from the wireless LAN 30 and then the operation of the sub-AP is no longer necessary in association with the exit, needlessly maintaining the sub-AP on an operating state is prevented. Also, it is preferable to deactivate the sub-AP unnecessary in terms of enhancement of the security of the AP 10 or a reduction in the load imposed on the AP 10 in order to activate the AP 10.

<Activation of the Sub-AP After Initial Setting>

The ROM 52 of the AP 10 has sub-AP activation program is stored thereon and readable by the CPU 50. The sub-AP activation program is stored on the ROM 52.

According to the execution of the sub-AP activation program, after establishing connections with at least one of the terminals 20, 22 and 24 in response to the first operation of the one-touch register button 80, that is, after completing the first negotiation of the type of the encryption scheme to be adopted by the respective terminals, the AP 10 activates all the sub-APs in response to operation every time the one-touch register button 80 is re-operated by the user or an operation member different from the one-touch register button 80 is operated by the user.

Figure 11:
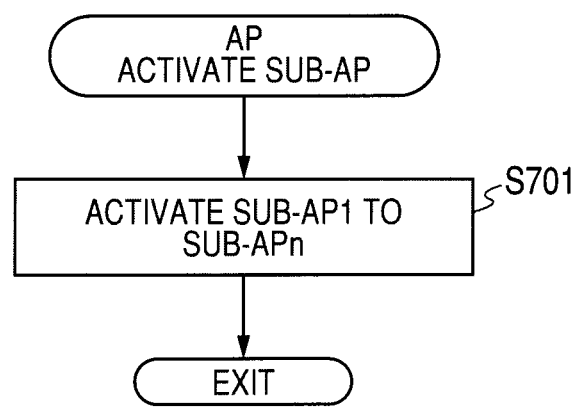
FIG. 11 is a flowchart schematically showing a sub-AP deactivation program executed by the wireless LAN access point shown in FIG. 1.

FIG. 11 is a flowchart schematically showing the sub-AP activation program. When the AP activation program is launched, the AP 10 at step S701 activates all of the normal sub-APs, i.e., the normal sub-AP1 to 3 in the embodiment.

According to the execution of the sub-AP deactivation program, when, after a connection has been established between the AP 10 and at least one of the terminals 20, 22 and 24 in response to the first operation of the one-touch register button 80, another of the terminals 20, 22 and 24 attempts to enter the wireless LAN 30 and when a deactivated normal sub-AP is required to be activated due to the entry of the another terminal, it is possible to prevent ineffective use of the entire resources of the wireless LAN 30, which is caused by maintaining the normal sub-AP deactivated.

As described above, after the plurality of normal sub-APs and the plurality of terminals 20, 22 and 24 have completed the first negotiation for determining the types of encryption schemes to be adopted, when the user again operates the one-touch register button 80 (an example of the second request) or another operation member differing from the one-touch register button 80 (another example of the second request), all the normal sub-APs are activated by the sub-AP activation program.

In the embodiment, the physical device such as the one-touch register button 80 or another operation member is used to input the first request and the second request to the AP 10. Alternatively, other devices such as virtual buttons displayed on a screen of a PC connected to the same network may be used as the device for inputting the first and second requests, and the AP 10 may start corresponding operations upon receipt of a specific signal transmitted from the PC in response to the operation of the button or the operation member.

Subsequently, a negotiation according to the process shown in FIG. 6 is again performed for determining the types of encryption schemes adopted between the normal sub-APs and at least one of the terminals 20, 22 and 24 currently connected to the normal sub-APs or another of the terminals 20, 22 and 24 to be additionally connected to the normal sub-APs if any. Consequently, the types of encryption schemes to be adopted by the respective terminals 20, 22 and 24, that is, the types of encryption schemes for use in the communication between the AP 10 and the terminals 20, 22 and 24 are determined once again for each of the normal sub-APs. Thereofre, the security levels of the encryption schemes adopted by the normal sub-APs are updated to reflect the up-to-date connection states of the respective normal sub-APs and the terminals.

According to the embodiment described above, the AP 10 includes multiplexed a plurality of virtual normal sub-APs in connection with the selectable security levels. Further, the plurality of normal sub-APs are independent of one another in terms of security levels to be set for the wireless communication.

Therefore, when the plurality of terminals supporting different security levels are respectively connected to the plurality of different normal sub-APs, a security level to be finally adopted by a terminal belonging to a certain normal sub-AP does not depend on security levels supported by another terminal belonging to another normal sub-AP.

Consequently, for example, when a security level to be finally adopted by one terminal belonging to a certain normal sub-AP is determined, the security level is not lowered to a security level which is highest level supported by another terminal belonging to another normal sub-AP but lower than the security level of the one terminal.

Incidentally, when an encryption key is exchanged between the AP 10 and the respective terminals in order to select an optimum encryption scheme both supported by the AP 10 and the terminals, there has been used an SSID different from the SSID of the AP 10 for data communication. This method requires switching of the SSID, which leads to the temporary interruption of the data communication because of exchange of an encryption key.

In contrast, in the present embodiment, the plurality of sub-APs are operable independently of one another, and the sub-APs (normal sub-APs) used for establishing data communication with the terminal are separated from the sub-AP (key exchange special sub-AP) used for exchanging the encryption key with the terminal. Consequently, temporary interruption of data communication, which would otherwise be caused by exchange of an encryption key, is avoided.

In the embodiments, the normal sub-AP1 to 3 serve as an example of the normal sub-access points. A unit of the computer of the AP 10 executing steps S401 through S404 shown in FIG. 8 serves as an example of the selector.

The key exchange special sub-APz serves as an example of the special sub-access point. A portion of the computer of the AP 10 executing step S206 (see FIG. 9) shown in FIG. 6 serves as an example of the activation control unit.

A portion of the computer of the AP 10 executing the sub-AP deactivation program shown in FIG. 10 serves an example of the activation control unit. A portion of the computer of the AP 10 executing the sub-AP activation program shown in FIG. 11 serves an example of the activation control unit.

The MAC 100 serves as an example of the one physical MAC. The respective virtual MACs 1, 2, and 3 serve as examples of the virtual MACs, and SSIDs of the respective virtual MACs 1, 2, and 3 serve as examples of identifiers.

In the present embodiment, the plurality of sub-access points are embodied as virtual sub-APs, which are operated by one physical unit but corresponding numbers of logical unit. However, the sub-access points are not limited to the virtual sub-APs and may also be materialized as, for example, a plurality of physical sub-access points provided within the housing 40. In this case, the plurality of physical sub-access points each includes a corresponding physical MAC.

Although the embodiments of the present invention have been described in detail above by reference to the several drawings, these embodiments are simply illustrative. The present invention can also be implemented in other forms where various alterations or improvements are made to the present invention on the basis of the knowledge of the persons skilled in the art.

What is claimed is:

1. A wireless LAN (Local Area Network) access point comprising:
    a physical controller, wherein the physical controller is operable as a plurality of virtual controllers that respectively logically configure a plurality of sub-access points to which different unique identifiers are respectively assigned and which are operable independently of one another,
    the plurality of sub-access points include a plurality of normal sub-access points and a special sub-access point, the plurality of normal sub-access points supporting a plurality of encryption schemes respectively associated with different security levels and the special sub-access point commonly used for the plurality of normal sub-access points,
    one or more encryption schemes of the plurality of encryption schemes are assigned to each of the plurality of normal sub-access points to allow each of the plurality of normal sub-access points to perform wireless communication using one of the assigned encryption schemes, such that highest security levels of the respective normal sub-access points are different from one another,
    the special sub-access point is configured to exchange security information indicating a security level with a terminal device before each of the normal sub-access points start operation, and
    upon exchange of the security information, wireless communication between one normal sub-access points and the terminal device is performed using an encryption scheme selected based on the security information; and
    an activation control unit configured to activate or deactivate each of the normal sub-access points independently, wherein the activation control unit is configured to determine, for each of the normal sub-access points, whether there is a terminal device connectable to the each normal sub-access point, and deactivate the normal sub-access point if the normal sub-access point is connectable to no terminal device.

2. The wireless LAN access point according to claim 1, wherein
    each of the normal sub-access points is wirelessly connectable to the terminal device, and
    the wireless LAN access point further comprises a selector configured to select an encryption scheme used in a wireless communication between one normal sub-access point and the terminal device, regardless of an encryption scheme used in a wireless communication between another normal sub-access point and another terminal device.

3. The wireless LAN access point according to claim 2, wherein
    when the selector is requested to select encryption scheme for one normal sub-access point, the selector negotiates encryption schemes with the terminal device based on the encryption schemes assigned to the one normal sub-access point and one or more encryption schemes supported by the terminal device and then selects an encryption scheme used in the wireless connection between the one normal sub-access point and the terminal device based on the negotiation, and
    the plurality of sub-access points include the special sub-access point configured to exchange an encryption key with the terminal device to perform the negotiation.

4. The wireless LAN access point according to claim 1, wherein the activation control unit executes the determination and deactivation in response to a first request to establish a connection between the wireless LAN access point and a first terminal device.

5. The wireless LAN access point according to claim 4, wherein
the activation control unit executes the determination and deactivation after establishing the connection.

6. The wireless LAN access point according to claim 5, wherein
the activation control unit activates one or more predetermined normal sub-access points in response to a second request to establish a connection between the wireless LAN access point and a second terminal device different from the first terminal device.

7. The wireless LAN access point according to claim 6, further comprising:
a request input device to input at least one of the first request and the second request.

8. The wireless LAN access point according to claim 1, wherein
the physical controller processes data for the virtual controllers with the encryption scheme selected for the respective normal sub-access points in a time sharing manner.

9. A non-transitory computer-readable medium having a computer program stored thereon and readable by a computer of a wireless LAN (Local Area Network), said computer program, when executed by the computer, causes the computer to operate as:
a physical controller, wherein the physical controller is operable as a plurality of virtual controllers that respectively logically configure a plurality of sub-access points to which different unique identifiers are respectively assigned and which are operable independently of one another, the plurality of sub-access points include a plurality of normal sub-access points and a special sub-access point, the plurality of normal sub-access points supporting a plurality of encryption schemes respectively associated with different security levels and the special sub-access point commonly used for the plurality of normal sub-access points,
one or more encryption schemes of the plurality of encryption schemes are assigned to each of the plurality of normal sub-access points to allow each of the plurality of normal sub-access points to perform wireless communication using one of the assigned encryption schemes, such that highest security levels of the respective normal sub-access points are different from one another,
the special sub-access point is configured to exchange security information indicating a security level with a terminal device before each of the normal sub-access points start operation, and
upon exchange of the security information, wireless communication between one normal sub-access points and the terminal device is performed using an encryption scheme selected based on the security information; and
an activation control unit configured to activate or deactivate each of the normal sub-access points independently, wherein the activation control unit is configured to determine, for each of the normal sub-access points, whether there is a terminal device connectable to the each normal sub-access point, and deactivate the normal sub-access point if the normal sub-access point is connectable to no terminal device.

* * * * *